(12) United States Patent
Davies et al.

(10) Patent No.: US 6,614,552 B2
(45) Date of Patent: *Sep. 2, 2003

(54) PRODUCING VISUAL IMAGES

(75) Inventors: Neil Davies, Goole (GB); Malcolm McCormick, Sheffield (GB)

(73) Assignee: DeMontfort University, Leicester (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/750,217
(22) PCT Filed: Jun. 5, 1995
(86) PCT No.: PCT/GB95/01290
§ 371 (c)(1),
(2), (4) Date: Dec. 3, 1996
(87) PCT Pub. No.: WO95/34018
PCT Pub. Date: Dec. 14, 1995

(65) Prior Publication Data
US 2003/0058472 A1 Mar. 27, 2003

(30) Foreign Application Priority Data
Jun. 4, 1994 (GB) ................................ 9411226
Nov. 24, 1994 (GB) ................................ 9423733
Feb. 28, 1995 (GB) ................................ 9503941

(51) Int. Cl.[7] .......................... H04N 1/387; G02B 27/44
(52) U.S. Cl. ...................... 358/1.18; 358/450; 359/458; 396/330
(58) Field of Search .................. 395/117; 358/450, 358/428, 501, 299, 302; 382/154; 355/22; 359/458, 463, 455, 457, 459, 462; 396/306, 330, 327

(56) References Cited

U.S. PATENT DOCUMENTS

| | | | | |
|---|---|---|---|---|
| 3,584,948 A | * | 6/1971 | Herriott | 355/77 |
| 3,657,981 A | * | 4/1972 | Benton | 396/330 |
| 4,078,854 A | * | 3/1978 | Yano | 359/458 |
| 4,153,457 A | * | 5/1979 | Kellie | 359/893 |
| 4,283,109 A | * | 8/1981 | Huff et al. | 359/15 |
| 4,529,228 A | * | 7/1985 | Kramer | 283/117 |
| 4,552,442 A | * | 11/1985 | Street | 396/330 |
| 4,668,063 A | * | 5/1987 | Street | 396/330 |
| 4,783,133 A | * | 11/1988 | Chen | 359/23 |
| 5,040,871 A | * | 8/1991 | Davies et al. | 359/458 |
| 5,113,213 A | * | 5/1992 | Sandor et al. | 355/22 |
| 5,349,419 A | * | 9/1994 | Taguchi et al. | 355/22 |
| 5,373,335 A | * | 12/1994 | Street | 396/155 |
| 5,436,738 A | * | 7/1995 | Manico | 358/503 |
| 5,455,689 A | * | 10/1995 | Taylor et al. | 358/450 |
| 5,499,138 A | * | 3/1996 | Iba | 359/569 |
| 5,519,794 A | * | 5/1996 | Sandor et al. | 382/285 |
| 5,557,413 A | * | 9/1996 | Ebihara et al. | 358/296 |
| 5,560,799 A | * | 10/1996 | Jacobsen | 156/277 |
| 5,675,377 A | * | 10/1997 | Gibas | 348/47 |
| 5,764,231 A | * | 6/1998 | Ray et al. | 345/419 |
| 5,973,700 A | * | 10/1999 | Taylor et al. | 345/427 |

FOREIGN PATENT DOCUMENTS

| WO | WO-91/11745 A1 | * | 8/1991 | G02B/27/44 |
|---|---|---|---|---|
| WO | WO-93/20473 A1 | * | 10/1993 | G02B/27/22 |

* cited by examiner

Primary Examiner—Edward Coles
Assistant Examiner—Joseph R. Pokrzywa
(74) Attorney, Agent, or Firm—Bracewell & Patterson, L.L.P.

(57) ABSTRACT

A method for reproducing an integral, panoramogramic or full spatial image for viewing using a decoding screen as a 3-D picture comprising representing the image as an array of image points with a density corresponding to high resolution ink printing.

12 Claims, 7 Drawing Sheets

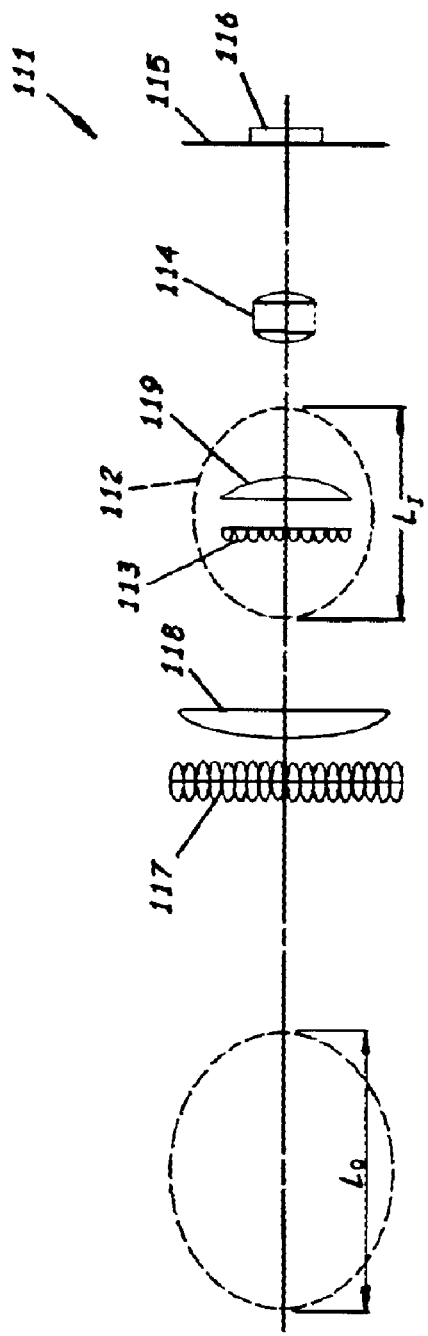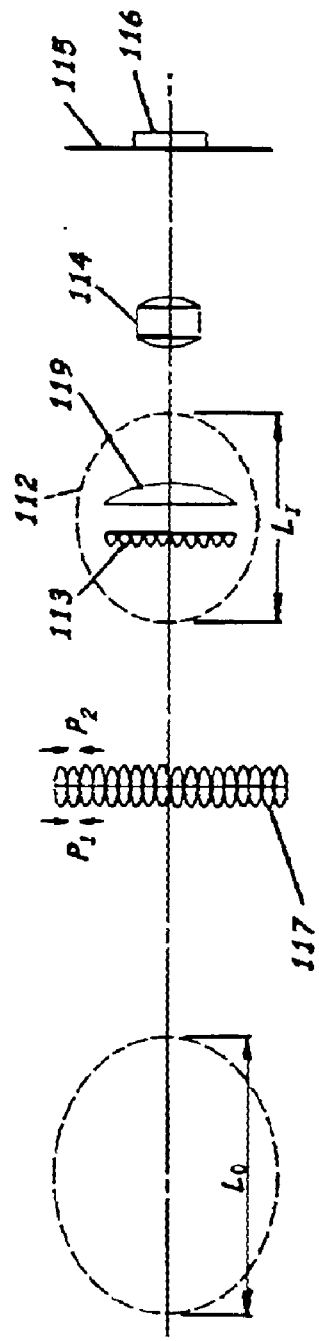

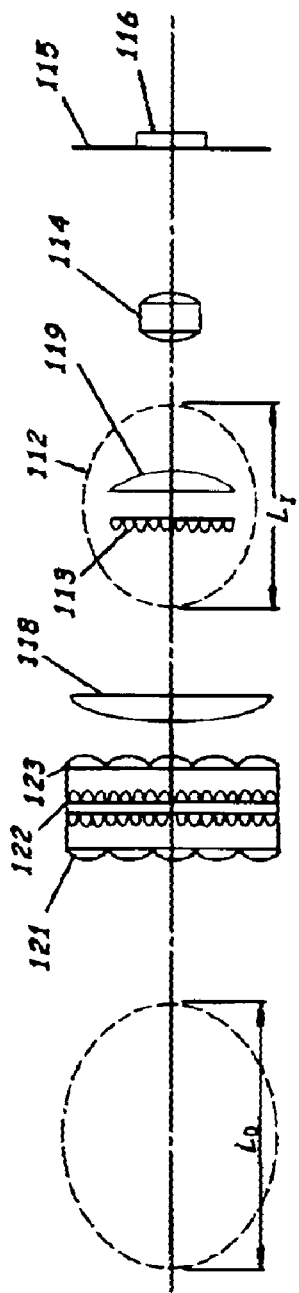
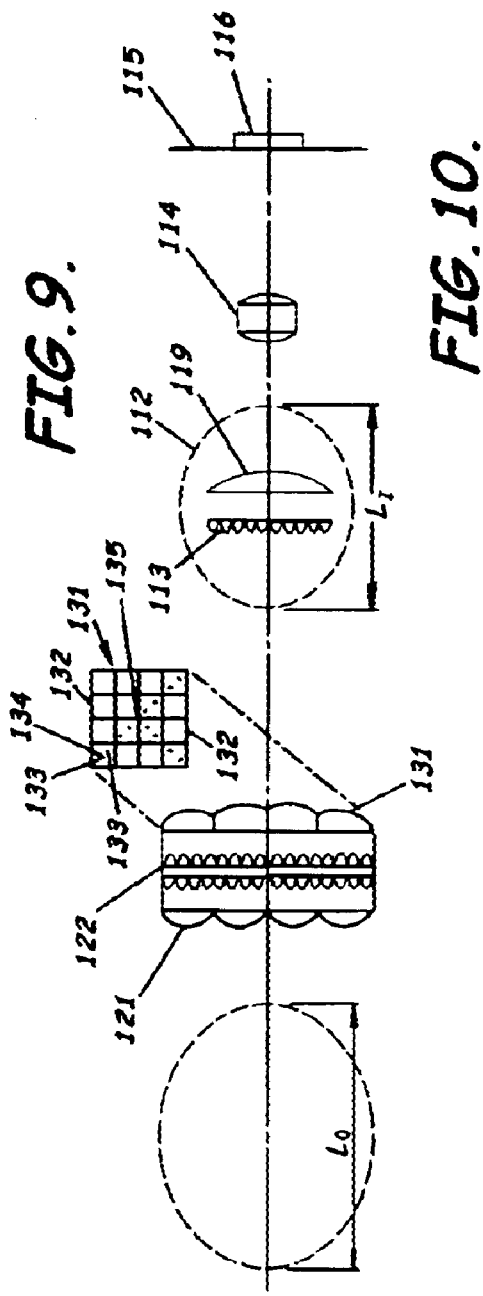
FIG. 9.
FIG. 10.

PRODUCING VISUAL IMAGES

This invention relates to producing visual images.

The production, from a continuous parallax view of multiview image, of integral or panoramogramic images for viewing using a decoding screen as 3-D pictures is well-known. A photographic image can be reproduced photographically to provide multiple such images. The need, as hitherto perceived, to reproduce the images photographically has imposed restrictions on the use of such images.

The present invention provides a method by which such images may be reproduced which removes such restrictions.

The invention comprises a method for reproducing an integral or panoraragramic image for viewing using a decoding screen as a 3-D picture comprising printing the image using a high resolution ink printing technique.

Hitherto it has been thought—generally speaking quite correctly—that printing by any of the conventional printing techniques would lose so much of the parallax information in an integral or panoramagramic image that the image, even when viewed using a decoding screen, would be poor and not recognisably 3-D. It is now found, however, that high resolution printing techniques preserve the parallax information so as to give very, good 3-D pictures.

The printing technique may be a relief printing technique such as gravure printing and may be a frequency modulated technique, in which the dots are not regularly spaced but spaced more or less closely according to the print density required, or an amplitude modulated technique in which the dots are regularly spaced but vary in size.

The printing technique may be a half tone printing technique, and may be a screen printing technique.

For off-the-page viewing, a resolution of 40 screen lines/cm or higher is found to give very good results. Parallax information can be retained at greater screen pitches. The screen pitch will depend also on the lenticular/microlens pitch that produced the original image. An integral number of addressable points may be located behind each microlens, but it is not essential.

The printing technique may be a colour printing technique.

The invention also comprises a print produced by a method according to the invention, as well as such a print in combination with a decoding screen. The decoding screen may be attached to the print, and may be applied to the print by an embossing technique.

The image points may, however, comprise pixels on an active image screen such as an lcd or crt screen or any other electronically addressed display system.

Surprisingly, the resolution of the image may be less than 400 dots or pixels per cm, and may be as low as 32 dots or pixels per cm. Put another way, the resolution of the image may be of the order of 1,000 dots or pixels per square cm, good results being obtained with a resolution between 2,000–5,000 dots per square cm. The figure is related to the decoding screen pitch. The figure of 32 dots or pixels per cm is suitable for 0.6 mm pitch microlenses.

The image point spacing—the dot or pixel spacing—may be more than half that of the decoding screen lens spacing—this is also surprising, as it means there can be less than two pixels per microlens.

The image points may comprise a computer generated amplitude distribution, which may be generated ab initio by computer software, or it might be generated by computer software manipulation of three dimensional information derived from imaging a real scene. Whilst this can clearly be photographic imaging, the real scene is not necessarily imaged in visible radiation but may be imaged by radar, for example, or x-rays, magnetic resonance, ultrasound or any other imaging technique capable of providing three-dimensional image data whether in a single take or tomographically.

Two or more amplitude distributions generated by the same or by different means—e.g. one photographically, one by computer software, may be sectionalised and/or manipulated and mixed in spatial form.

The displayed images may be a still or a moving image—a moving image may be mixed with a still image.

The invention also comprises apparatus for producing an integral panoramagramic image comprising an image represented as an array of image points with a density corresponding to high resolution ink printing and a decoding screen.

The array of image points may be comprised in a pixel screen, and the apparatus may comprise an input to the pixel screen of a computer generated amplitude distribution comprising three dimensional image information.

The decoding screen may be cylindrical-lenticular or integral microlens. Other forms of decoding screen may be used, however, such as a parallax barrier, a two dimensional pinhole array or even a scanning slit. If the amplitude distribution is computer generated, or computer manipulated, there will be no need to limit the decoding arrangement to match the image taking arrangement.

The invention also comprises a full spatial image capturing arrangement comprising:

a multiple-imaging objective lens system, having an imaging zone of extended depth corresponding to an object region of extended depth;

a lensed encoding screen located in said imaging zone forming an encoded image from the imaging zone;

a copy lens arrangement transferring the encoded image to an image plane; and an image recording device for the image in the image plane.

Multiple-imaging is not to be confused with "multiview", a term used to describe multiple separate images taken from spaced apart lenses for eventual assembly into a composite image which gives an impression of three dimensions in the image, but which is by no means full spatial imaging with continuous parallax. "Multi-imaging" here refers to a synthesised aperture—a wide aperture lens simulated by an assembly of smaller lenses.

Such an arrangement can be used to capture images to be reproduced or displayed using methods and apparatus as above described.

The multiple-imaging objective lens system may comprise a double transmission screen and a convex lens. The double transmission screen may comprise a double cylindrical lenticular transmission screen or a double integral microlens screen.

The multiple-imaging objective lens system may, however, comprise a segmented convex lens.

The lensed encoding screen may comprise a cylindrical lenticular screen or an integral microlens screen.

The image recording arrangement may comprise a photographic emulsion (where reproduction is intended to be e.g. by printing, especially) or a charge coupled device array or other electronically addressable array of sensitive elements.

Embodiments of apparatus for producing an integral panoramogramic or full spatial image and methods therefore and embodiments of full spatial image capturing arrangements according to the invention will now be described with reference to the accompany drawings, in which:

FIG. 1 shows a printing process for reproducing images,

FIG. 2 shows a colour separation screen alignment scheme, applicable to both printing and active e.g. video screen display, FIG. 3 shows frequency modulated printing, FIG. 4 is a diagrammatic illustration of an arrangement for displaying full spatial images using a pixel screen, FIG. 5 is a diagrammatic illustration of another arrangement for displaying full spatial images using a pixel screen, FIG. 6 is a diagrammatic illustration of another arrangement for printing full spatial images, FIG. 7 is a diagrammatic illustration of an image capturing arrangement, FIG. 8 is a diagrammatic illustration of a variant of the arrangement of FIG. 7, FIG. 9 is a diagrammatic illustration of another image capturing arrangement, FIG. 10 is a diagrammatic illustration of another image capturing arrangement, FIG. 11 is a diagrammatic illustration of yet another image capturing arrangement, FIG. 12 is a variant of FIG. 11, FIG. 13 is a variant of FIG. 12, FIG. 14 is a diagrammatic illustration of an image playback arrangement, FIG. 15 is a variant of FIG. 14, FIG. 16 is another variant of FIG. 14, and FIG. 17 is a diagrammatic illustration of another image playback arrangement.

FIGS. 1 to 3 of the drawings illustrates methods for reproducing an integral or panoramagramic or full spatial image, from e.g. a photographic image 1 which is a continuous parallax view or a multiview image. Such images have hitherto only been reproduced photographically—standard printing techniques would lose essential parallax information from the image. The methods comprise printing the image using a high resolution ink printing technique.

The image 1 is used to generate high resolution colour separations 2, for colour printing which may be coloured for making prints 3 of the image 1. Of course, for monochrome, only one high resolution image need be generated.

The colour separations 2 comprise four plates, one of each subtractive colour cyan, magenta, yellow, as well as black if added contrast is required.

The printing technique may be a relief printing technique such as gravure printing, which can be an amplitude modulated or a frequency modulated printing technique or other high resolution printing technique such as half tone printing, dye sublimation or thermal wash techniques.

The image may be viewed, depending on how the original photographic image was made, using a lenticular decoding screen 8 or a spherical/aspherical lenslet decoding screen 9.

The high resolution printing technique involves high spatial frequency scanning which can be achieved using commercial drum or flat bed laser scanners. A low dot density then retains the 3-D information of the original image.

Moiré effects can be manifest when the printed image is viewed using the decoding screen. They may be avoided or minimised by careful choice of screen orientations in colour printing. It is found to be very effective to separate the orientations by large geometrical angles, and it is more important to secure the maximum geometrical angle between each printing screen alignment and the integral or lenticular decoding screen than to arrange the maximum separation between each colour screen.

A scheme is illustrated in FIG. 2 which shows the disposition of a lenticular screen with respect to a four separation print, in which cyan, magenta, yellow and black screen orientations are represented by lines $C^1$, $C^2$, $C^3$, $C^4$ and the lens axis of symmetry by C. This arrangement is for square shaped dots D as illustrated. This is a compromise which achieves a maximum angle between the axis of symmetry and any colour screen direction but reduces the available angles of separation between each of the four colour screens.

In this scheme, the minimum geometric angle between the alignments of the colour separates is 15°, while the minimum geometric angle between the lenticular screen axis of symmetry C and any colour alignment is 30°.

With integral decoding screens, such as square base integral screens, there are more axes of symmetry, and to achieve maximum separation between each of these axes of symmetry and the printing screen alignments, the axis of each of the colour screens needs to be displaced from the locations shown in FIG. 2 by an angular (anticlockwise) rotation of 7.5°. Alternatively, the same orientations can be maintained which gives maximum separation between the vertical axis of symmetry and the screen angle and the minimum separation between the horizontal axis of symmetry and the screen angle or vice versa.

Complete suppression of Moiré is achieved by using frequency modulated screening, in which the dots are arranged randomly. This is effected as shown in FIG. 3 by dividing each dot area by, say a 12×12 grid and randomly placing dots in the grid to achieve the equivalent halftone density to a single amplitude modulated dot.

In dye sublimation and thermal wax techniques each block is a mixed colour, which will give rise to fewer Moiré problems.

The decoding screen 8, 9 may be placed over the print 3 or a combination of print 3 and decoding screen may be made in which the decoding screen is itself applied to the print 3 as by a printing technique.

The print 3 or combination may comprise part of a book or magazine or other publication.

A decoding screen could be supplied separately to be placed over the print 3 for viewing. However, where Moiré effects would be encountered with misalignment of decoding screen and print, the permanently-in-place decoding screen has clear advantages.

What has been described with reference to FIGS. 1 to 3 in relation to ink printing applies equally well, mutatis mutandis to any arrangement involving an array of image points, in particular a pixel screen such as a crt or lcd video screen or any other electronically addressable display device. Such a screen or device may, of course, be monochromatic or colour, the colour separates of the printing process being equivalent to the separate colour signals of a colour video screen. Equivalent techniques to avoid or minimize Moiré effects are used, namely angling each colour array separately with regard to the alignment of the decoding screen microlenses. For best results, clearly, colour screens will be specially designed with the colour arrays at the appropriate relative angles, but, of course, even with conventional screens the Moiré effect can be reduced by appropriate angling of the decoding screen and Moiré can be eliminated for conventional monochrome screens by such angling.

FIGS. 4, 5 and 6 illustrate apparatus and methods for producing visual images in which a computer 41 generates an amplitude distribution comprising three dimensional image information which is displayed on a two dimensional pixel screen 42 viewed through a decoding screen 43.

In FIG. 4, the decoding screen 43 is shown as a cylindrical-lenticular microlens screen which, given the appropriate amplitude distribution on the pixel screen 42, will give a true parallax effect when viewed from different positions right and left in the horizontal direction of the screen 43 and, because the viewers eyes are separated in this direction, gives the usual effect of binocular vision of a three dimensional scene comprising accommodation and convergence working in unison.

The decoding screen 43A in FIG. 5 is a spherical-lenticular, so-called integral microlens screen having a two dimensional array of spherical microlenses. With an appropriate amplitude distribution on the pixel screen 42, this will form an image which also has true parallax through movement of the viewing position in all directions.

Whilst these two decoding devices are preferred for brightness and sharpness of image, other decoding devices such as a two dimensional pinhole array, a parallax barrier or a scanning slit arrangement could be used instead.

While microlens arrays are usually regular arrays, this is not necessarily so in the case of the present invention, where the software can manipulate or generate information according to the nature of the decoding screen.

It is found, in any event, that the resolution of the pixel screen 42 can be as low as 32 dots per cm or 1000 dots per square cm for a decoding screen microlens pitch of 0.6 mm and, perhaps even more surprisingly, that there can be less than two pixels per microlens. This also implies that accurate alignment of a microlens screen with the pixel image is not a requirement if the information can be appropriately generated or manipulated by the software.

This is a surprisingly low resolution for a system which gives a bright, sharp image with true depth. It has clear implications in regard to the ability to handle real-time moving images, so as to make, for example, three dimensional television possible with little or no increase in the quantity of information required to be transmitted.

Whilst, in the drawings, the pixel screen 42 is shown simply as a monochromatic screen, clearly colour information can be dealt with in the usual way. The pixel screen 42 can of course be a crt screen or an lcd screen or any other electronically addressed display system. Equally, it could be a print generated by the computer 41, as is indicated by the broken line connection between computer 41 and pixel screen 42 as shown in FIG. 6.

While the amplitude distribution may be generated ab initio by the software, as indicated in FIG. 4, it may also be generated by software manipulation of three dimensional image information derived from a real scene, as suggested by the arrangements of FIGS. 5 and 6 in which 44 indicates a video camera or other imaging device such, for example, as an X-ray or ultrasound scanner, a CAT scanner for magnetic resonance imaging, all of which can be of considerable interest in medicine for diagnosis and surgery for displaying an image of an operation site with true depth perception magnified, with the depth dimension scaled equally with length and breadth.

Equally, radar information can be converted into a three dimensional visual image.

More specifically, true three dimensional images may be generated from any computer-generated three dimensional model, which may itself be generated for example by CAD software, visualisation software, or simulations systems, or even from a flat photograph or drawing which is processed to simulate three dimensions. Thus real-world three dimensional objects, such as buildings, bridges and other macroscopic artefacts or molecular systems, viral structures and other microscopic entities can be displayed as three dimensional images.

Standard image processing e.g. for noise removal and image enhancement may be carried out on information sampled from an image of a real-world scene, and images can be mixed, stretched, inverted and otherwise manipulated. Live and computer generated images can be mixed, colours changed, false colour introduced, all on the three dimensional information, to result in a three dimensional image. Such images may be used interactively e.g. in surgery where a surgeon can manipulate an actual "slave" implement by manipulating a "master" implement—which may itself be solid or projected by mixing into an image of an operation site a computer generated image.

In illustrating the apparatus and methods described with reference to FIGS. 4, 5 and 6, no reference has been made to the elimination or reduction of Moiré as described with reference to the earlier figures, but, of course, such elimination or reduction is possible by appropriate alignment of colour pixels as already noted. However, depending to some extent on the nature of the images and particularly the colour content thereof, it would be possible to effect at least some Moiré reduction by computer manipulation of the image data—arrays can be selected from the "square" array which are at 45° and 22½° to the principal directions of the array and while this adversely affects the resolution in those directions the trade-off may be worthwhile.

FIGS. 7 to 17 illustrate image capturing and playback arrangements suitable for use with the methods and apparatus above described and which, together therewith, will form the basis inter alia of a complete video recording and playback system for full spatial imaging.

FIGS. 7 to 10 illustrate full spatial image capturing arrangements comprising:

Figure 1:
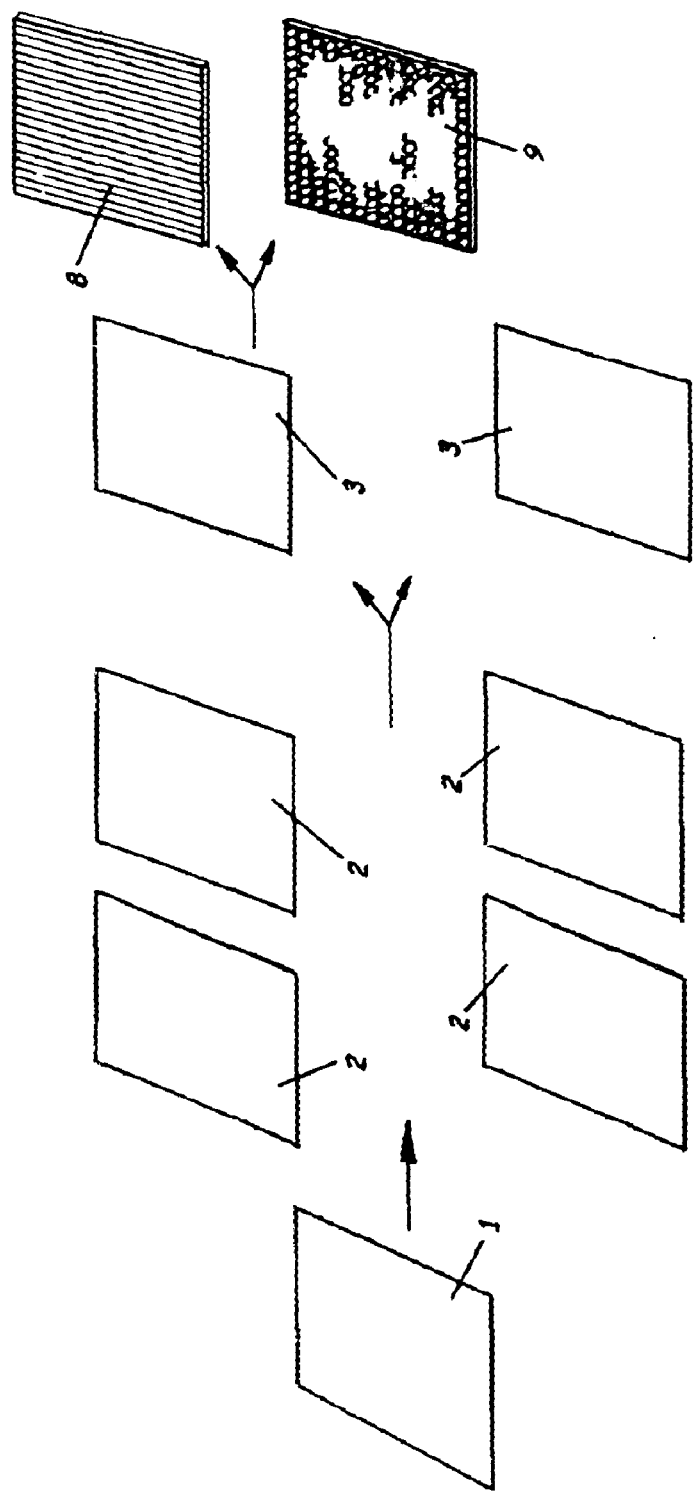
Figure 2:
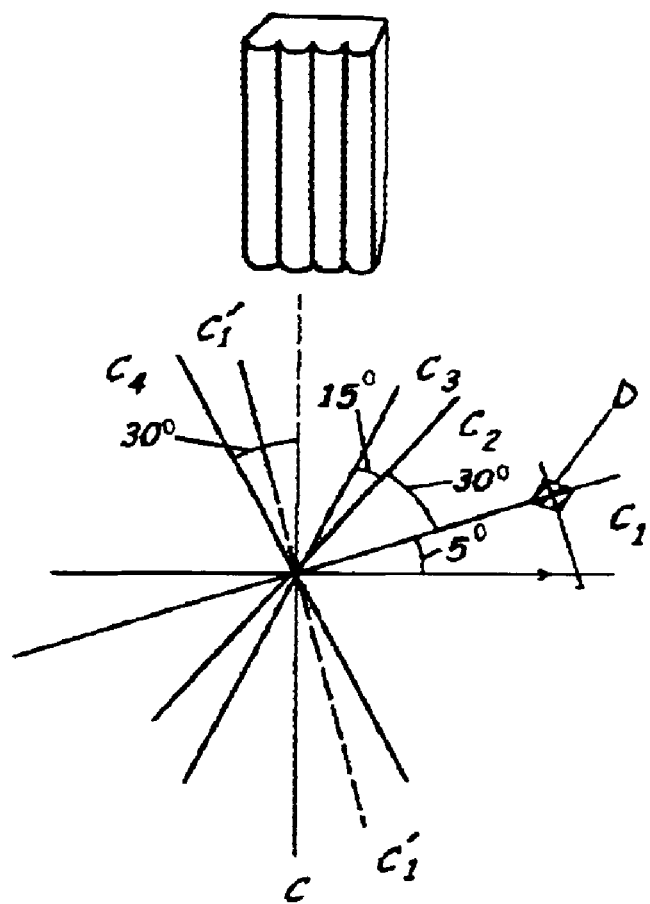
Figure 3:
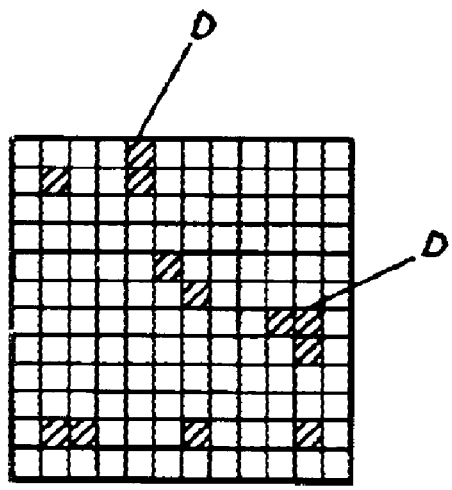
Figure 4:
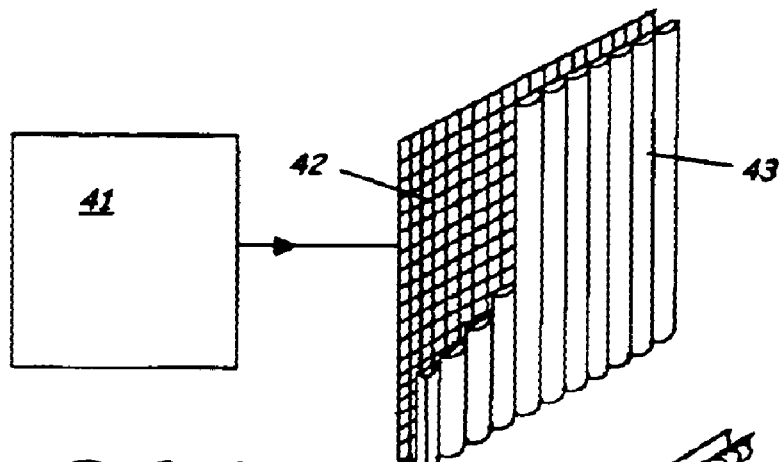
Figure 5:
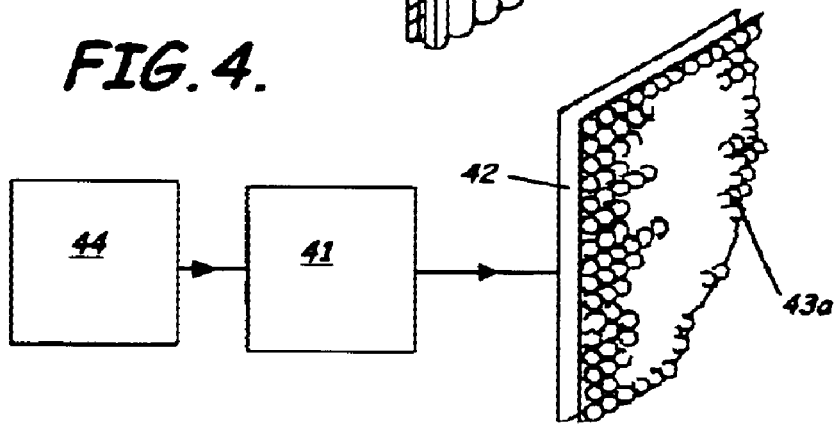
Figure 6:
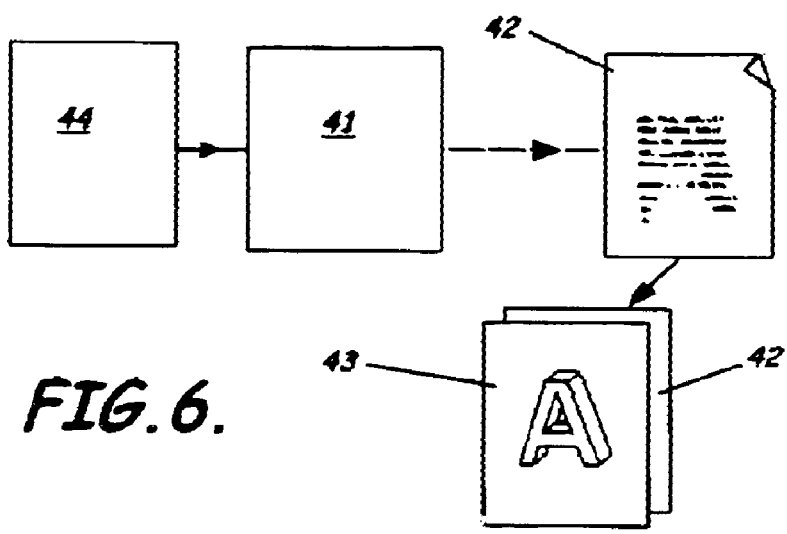

a multiplying-image objective lens system 11 having an image zone 112 of extended depth $L_1$, corresponding to an object region of extended depth $L_0$;

a lensed screen 113 located in said imaging zone 112 forming an encoded image from the imaging zone 112;

a copy lens arrangement 114 transferring the encoded image to an image plane 115; and an image recording device 116 for the image in the image plane 115.

In the embodiment illustrated in FIG. 7, the multiplying-imaging objective lens system 111 comprises a back to back microlens array 117 and a convex lens 118. FIG. 8 illustrates an arrangement like that of FIG. 7 but in which the objective lens system comprises a back-to-back microlens array 117 of unequal pitches, $P_1$, $P_2$, with no convex lens 118. FIG. 9 illustrates an embodiment in which the multiplying-imaging objective lens system comprises a macrolens array 121—microlens array 122—macrolens array 123 combination. In each case, the microlens array 117, 122 comprises a double transmission screen which may comprise either a double integral screen or a double lenticular screen, the former having spherical microlenses, the latter having cylindrical lenses, the cylinders being aligned vertically.

FIG. 10 illustrates an arrangement in which the multiplying-imaging objective lens system comprises a segmented lens 131—the inset to this figure shows a sixteen-element segmented lens 131 in which the segments 132 have principal axes 133 offset from their centres 134 by amounts proportional to the distances of the centres 134 from the principal axis 135 of the lens 131 as a whole.

The lensed screen 113 located in the imaging zone 112 is an integral or a lenticular screen.

Associated with the lensed screen 113 is a field lens 119, which ensures an even illumination of the image plane as seen by the copy lens 114, which transfers the encoded image from the screen 113 to the image plane 115 and the recording device 116, which can comprise a photographic emulsion or a ccd array.

The copy lens 114 is selected to control the image magnification at the image plane 115.

In a typical arrangement using the macrolens—microlens—macrolens array of FIG. 9, the input macrolens array has a focal length of 80 mm at F No. 1.5 or 2, the microlens array is a double integral screen of pitch 90 μm with the same F No. as the macrolens, and the output macrolens array is the same as the input array.

The image plane 115 microlens screen (where required) can have a pitch according to the image size or the required image depth—say from 100 μm to 500 μm. It will have the same F No. as the screen 113.

Figure 11:
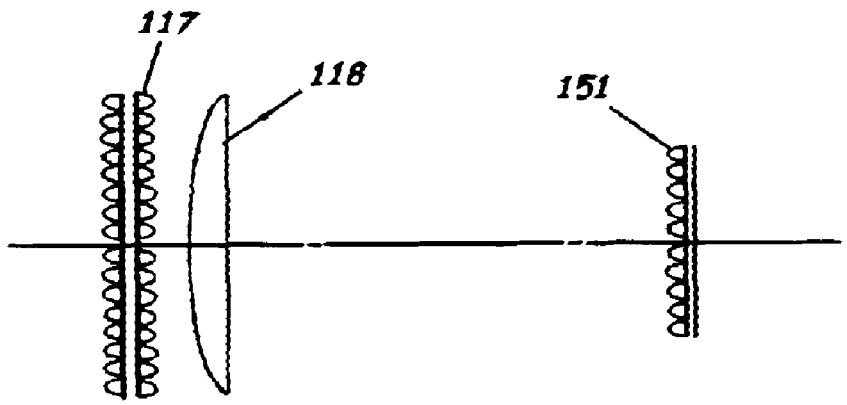
Figure 12:
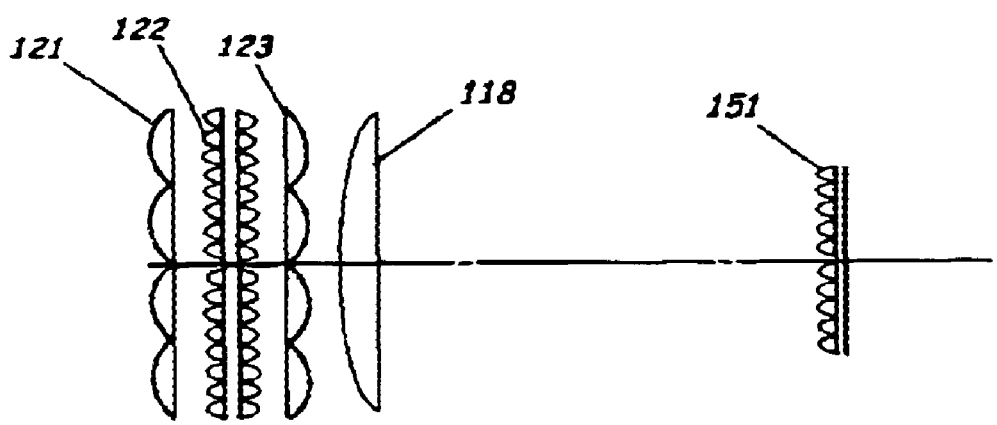
Figure 13:
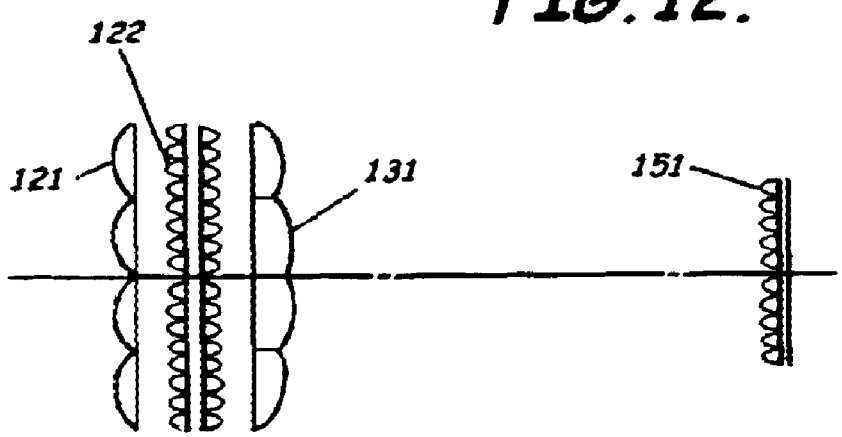

FIG. 11 illustrates image capture on to a photographic emulsion which is overlayed with an integral microlens screen 151 or which has a front surface embossed so as to form such a screen 151. The "taking" lens is the back-to-back double integral screen 117 of FIG. 7, together with the convex lens. FIG. 12 shows an arrangement in which the macrolens array—microlens array—macrolens array 121, 122, 123 of FIG. 9 is substituted for the double integral screen 117, and FIG. 13 shows a segmented lens arrangement 121, 122, 131 as shown in FIG. 10 used as the taking lens.

Figure 14:
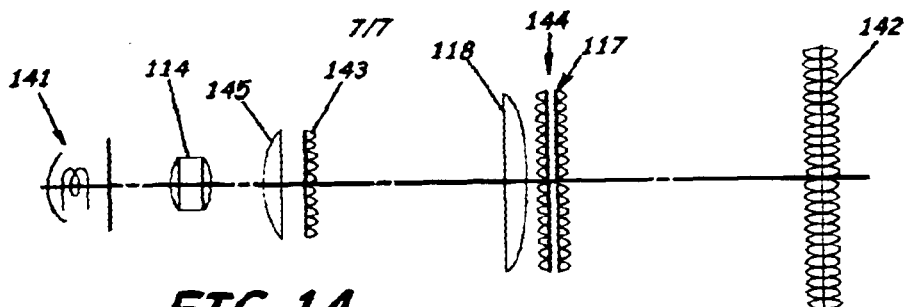

FIG. 14 illustrates a projection of playback arrangements for playing back images captured by the arrangements of FIGS. 7 to 13 comprising a projector 141 in which the captured image is illuminated and cast via a copy lens 114 on to a double integral screen 142 to reconstruct a three-dimensional image, via microlens screen 143 and a magnifying arrangement 144. The magnifying arrangement comprises a backs-to-back microlens array 117 and convex lens 118, as used in FIG. 7, for reproducing images made by the arrangement of FIG. 7.

Figure 15:
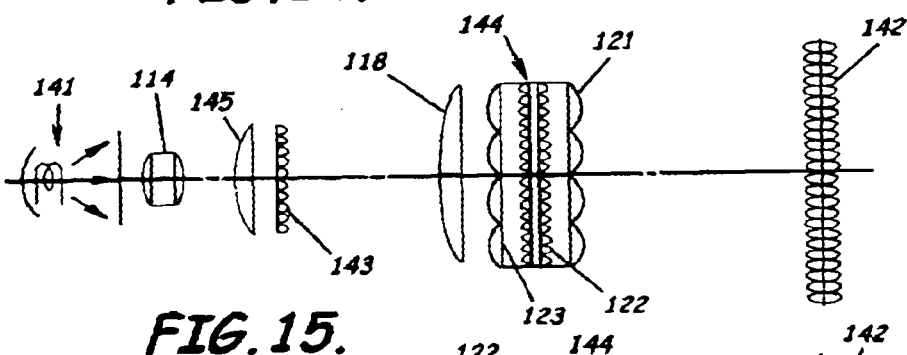

FIG. 15 illustrates a similar arrangement, but in which the microlens array 117 and convex lens 118 are replaced by a macrolens array—microlens array—macrolens array arrangement 121, 122, 123, as used in the arrangement of FIG. 9, and appropriate for reproducing images made by that arrangement.

Figure 16:
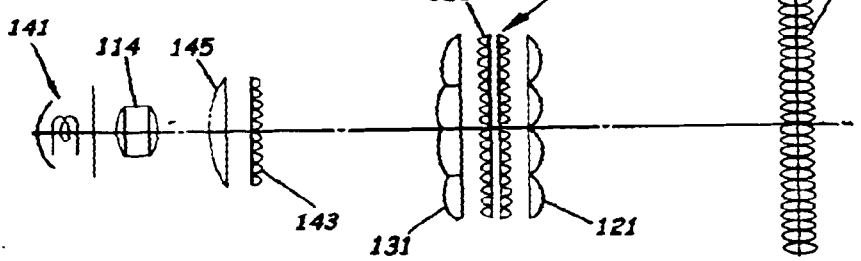

FIG. 16 illustrates a similar arrangement, but the array 123 being replaced by segmented lens arrangement 131 as shown in FIG. 10, and appropriate for reproducing images made by that arrangement.

These arrangements are essentially the reverse of the image-capturing arrangements of FIGS. 7 to 13, in which, indeed, if an image were projected from image plane 115, a three-dimensional image would be seen corresponding to the subject, with the use of a double integral recording screen.

The projector 141 can of course be a slide or cine projector, with back illumination, or it can comprise a video screen in the case of a ccd array image capture.

A field lens 145, as before, can be associated with the screen 143.

Figure 17:
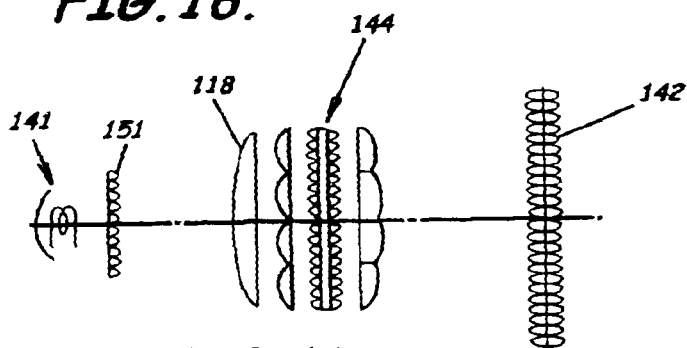

FIG. 17 illustrates a playback arrangement for the embossed or overlayed microlens-on-emulsion images formed by the various embodiments illustrated in FIGS. 11 to 13. The projector 141 casts the image on to the double integral screen 142 via the macrolens array-microlens array-macrolens 144 and convex lens 118 of FIG. 12 or, in variants via the back to back microlens array 117 and convex lens 118 of FIG. 11, or via the segmented lens arrangement of FIG. 13, depending on which arrangement was used to capture the image.

The projector 141 may include an integral field lens between the lamp and the emulsion.

It should be understood that the methods of the present invention may be achieved in instances in which the imaging technique is a tomographic technique. Such tomographic techniques are well known in the art.

What is claimed is:

1. A full spatial image capturing arrangement to capture an object region of extended depth, the full spatial image capturing arrangement comprising:

a multiple-imaging objective lens system having an imaging zone of extended depth corresponding to the object region of extended depth and a back-to-back microlens array positioned separate and spaced-apart from the object region and positioned between the object region and the imaging zone;

a lensed encoding screen, positioned separate and spaced-apart from said multiple-imaging objective lens system, located in said imaging zone to thereby form an encoded image from the imaging zone;

a single imaging copy lens arrangement positioned separate from said multiple-imaging objective lens system and said lensed encoding screen to receive said encoded image from said lensed encoding screen, produce a single-image, and transfer the encoded single-image to an image plane; and an image recording device positioned to receive and record the single-image in the image plane with a selected image magnification.

2. The arrangement according claim 1, in which the back-to-back microlens array of the multiple-imaging objective lens system comprises a double transmission screen.

3. The multiple-imaging objective lens system according to claim 2, in which the double transmission screen comprises a double cylindrical-lenticular transmission screen.

4. The multiple-imaging objective lens system according to claim 2, in which the double transmission screen comprises a double integral microlens screen.

5. The multiple-imaging objective lens system according to claim 1, in which the multiple-imaging objective lens system further comprises a segmented lens.

6. The arrangement according to claim 1, in which the lense encoding screen comprises a cylindrical-lenticular screen.

7. The arrangement according to claim 1, in which the lensed encoding screen comprises an integral microlens screen.

8. The arrangement according to claim 2, wherein
   the back-to-back microlens array forms a double transmission screen having a first and second pitch, the second pitch not substantially equal to the first pitch; and wherein
   the copy lens arrangement comprises a convex lens pair.

9. The arrangement according to claim 1, in which the image recording device comprises a photographic emulsion.

10. The arrangement according to claim 1, in which the image recording device comprises a charge coupled device array or other electronically addressable array of sensitive elements.

11. A full spatial image capturing arrangement to capture an object region of extended depth, the full spatial image capturing arrangement comprising:

a multiple-imaging objective lens system, having an imaging zone of extended depth corresponding to the object region of extended depth and a back-to-back microlens array positioned separate and spaced-apart from the object region and positioned between the object region and the imaging zone;

a lensed encoding screen, positioned separate and spaced-apart from the multiple-imaging objective lens system, located in the imaging zone to thereby form an encoded image from the imaging zone;

a single imaging copy lens arrangement positioned separate from the multiple-imaging objective lens system and the lensed encoding screen to receive the encoded image from the lensed encoding screen, produce a single-image, and transfer the encoded single-image to an image plane;

a field lens positioned separate and spaced-apart from the multiple-imaging objective lens system, located in the imaging zone to thereby enhance illumination of the image plane as seen by the single imaging copy lens; and an image recording device positioned to receive and record the single-image in the image plane with a selected image magnification.

12. A full spatial image capturing arrangement to capture an object region of extended depth, the full spatial image capturing arrangement comprising:

a multiple-imaging objective lens system, having an imaging zone of extended depth corresponding to the object region of extended depth and macrolens array-back-to-back microlens array-macrolens array combination positioned separate and spaced-apart from the object region and positioned between the object region and the imaging zone;

a lensed encoding screen, positioned separate and spaced-apart from the multiple-imaging objective lens system, located in the imaging zone to thereby form an encoded image from the imaging zone;

a single imaging copy lens arrangement positioned separate from the multiple-imaging objective lens system and the lensed encoding screen to receive the encoded image from the lensed encoding screen, produce a single-image, and transfer the encoded single-image to an image plane; and an image recording device positioned to receive and record the single-image in the image plane with a selected image magnification.

* * * * *